(12) United States Patent
Schroeder

(10) Patent No.: US 7,891,645 B2
(45) Date of Patent: Feb. 22, 2011

(54) ADJUSTABLE AND PROGRESSIVE COIL SPRING SYSTEM FOR TWO WHEELED VEHICLES

(75) Inventor: Brady Matthew Schroeder, Simi Valley, CA (US)

(73) Assignee: Hayes Bicycle Group, Inc., Milwaukee, WI (US)

( * ) Notice: Subject to any disclaimer, the term of this patent is extended or adjusted under 35 U.S.C. 154(b) by 948 days.

(21) Appl. No.: 11/588,741

(22) Filed: Oct. 27, 2006

(65) Prior Publication Data

US 2008/0099968 A1    May 1, 2008

(51) Int. Cl.
*F16F 1/06*    (2006.01)
(52) U.S. Cl. .................. 267/178; 267/203; 280/276
(58) Field of Classification Search .................. 267/178, 267/136, 143, 196, 201, 202, 203; 280/276, 280/279, 284, 288, 275, 286
See application file for complete search history.

(56) References Cited

U.S. PATENT DOCUMENTS

| 783,236 | A | * | 2/1905 | Ashburn ...................... 280/276 |
|---|---|---|---|---|
| 3,559,976 | A | | 2/1971 | Jerz, Jr. |
| 3,984,119 | A | * | 10/1976 | Okazima ...................... 280/276 |
| 4,057,264 | A | * | 11/1977 | Suzuki et al. ................. 280/276 |
| 4,183,509 | A | | 1/1980 | Nishikawa |
| D262,959 | S | | 2/1982 | Cowan |
| D302,672 | S | | 8/1989 | Ueno |
| 5,301,973 | A | * | 4/1994 | Truchinski ................... 280/276 |
| D368,054 | S | | 3/1996 | Behrens |
| 5,551,674 | A | | 9/1996 | Johnsen |
| 5,580,075 | A | | 12/1996 | Turner et al. |
| 5,634,653 | A | * | 6/1997 | Browning .................... 280/276 |
| 6,105,988 | A | | 8/2000 | Turner et al. |
| 6,343,807 | B1 | | 2/2002 | Rathbun |
| 6,471,197 | B1 | | 10/2002 | Denk et al. |
| 6,520,524 | B1 | * | 2/2003 | Costa .......................... 280/276 |
| 6,592,136 | B2 | | 7/2003 | Becker et al. |

FOREIGN PATENT DOCUMENTS

JP    36704/72    8/1972
WO    WO2005/054046    6/2005

* cited by examiner

*Primary Examiner*—Pam Rodriguez
(74) *Attorney, Agent, or Firm*—Thomas I. Rozsa

(57) ABSTRACT

An adjustable coil spring system placed within a leg of a vehicle such as a mountain bicycle fork. The spring system comprises an adjustable first soft spring seated on top of a second firm spring having greater length than the first soft spring. A coupler assembly is positioned between two springs comprised of a threaded bolt threadedly received within a coupler. A spring adjustment mechanism may comprise a knob connected to the threaded bolt through a non-round shaped shaft, wherein the threaded bolt is disposed within the first soft spring. As the knob rotates, the coupler is moved up along the threaded bolt, decreasing the length of the first soft spring, thereby increasing firm spring characteristics of the spring system. As the knob rotates in an opposite direction, the coupler moves down, increasing the length of the first soft spring, thereby increasing soft spring characteristics of the spring system.

11 Claims, 8 Drawing Sheets

ADJUSTABLE AND PROGRESSIVE COIL SPRING SYSTEM FOR TWO WHEELED VEHICLES

BACKGROUND OF THE INVENTION

1. Field of the Invention

The present invention relates to the field of spring characteristics in vehicle suspension systems such as those used in bicycle and motorcycle suspension systems that are designed to improve compressibility of a spring system in response to riding conditions and the rider's weight.

2. Description of the Prior Art

Spring and shock distribution systems for changing the spring characteristics of a mountain bicycle fork depending on the riding conditions or the rider's weight are generally known. In the prior art, one way to change the spring characteristics is to change the entire spring assembly to a different spring assembly. In general, the rider wants a suspension spring to be soft in normal travel but if the rider hits bumps, it needs to be stiffer so the rider has a bottom out protection. In the prior art, another variation is to have one spring with two characteristics. Also, another variation is to have one spring inside the other where the softer spring is on the outside and the stiffer spring is on the inside. The problem with the prior art is that it's a static system. Once the rider selects the spring characteristics, the rider cannot adjust the spring compression characteristics or spring pre-load while riding.

The following 14 patents and published patent applications are the closest prior art references which are known to the inventors.

1. U.S. Pat. No. 3,559,976 issued to Joseph Jerz, Jr. on Feb. 2, 1971 for "Variable Stiffness Suspension System" (hereafter the "Jerz Patent");

2. U.S. Pat. No. 4,727,820 issued to Kenzo Okazima on Oct. 5, 1976 for "Suspension For Two-Wheeled Vehicle" (hereafter the "Okazima Patent");

3. U.S. Pat. No. 4,183,509 issued to Masao Nishikawa and assigned to Honda Giken Kogyo Kabushiki on Jan. 15, 1980 for "Shock Absorber for Vehicle Use" (hereafter the "Nishikawa Patent");

4. U.S. Pat. No. Des. 262,959 issued to Arnold A. Cowan and assigned to Interpary Corporation on Feb. 9, 1982 for "Shock Absorber" (hereafter the "Cowan Design Patent");

5. U.S. Design Pat. No. Des. 302,672 issued to Yutaka Ueno and assigned to Kabushiki Kaisha Showa Seisakusho on Aug. 8, 1989 for "Shock Absorber For Motorcycle" (hereafter the "Ueno Design Patent");

6. U.S. Design Pat. No. Des. 368,054 issued to Steven J. Behrens and assigned to Answer Products, Inc. on Mar. 19, 1996 for "Bicycle suspension Fork" (hereafter the "Behrens Design Patent");

7. U.S. Pat. No. 5,551,674 issued to Thore K. Johnsen on Sep. 3, 1996 for "Adjustable Resilient Support Device" (hereafter the "Johnsen Patent");

8. U.S. Pat. No. 5,580,075 issued to Paul H. Turner et al. and assigned to Rockshox, Inc. on Dec. 3, 1996 for "Bicycle Fork Suspension With Exchangeable Spring Unit" (hereafter the '075 Turner Patent");

9. U.S. Pat. No. 6,105,988 issued to Paul H. Turner et al. and assigned to RockShox, Inc. on Aug. 22, 2000 for "Adjustable Suspension System Having Positive And Negative Springs" (hereafter the '988 Turner Patent");

10. U.S. Pat. No. 6,343,807 issued to James C. Rathbun and assigned to Answer Products, Inc. on Feb. 5, 2002 for "Multi-Travel Suspension Fork For Cycles" (hereafter the "Rathbun Patent");

11. U.S. Pat. No. 6,471,197 issued to Peter Denk et al. and assigned to Denk Engineering GmbH on Oct. 29, 2002 for "Spring Device For Shock Absorber With Adjuster" (hereafter the "Denk Patent");

12. U.S. Pat. No. 6,592,136 issued to William M. Becker and assigned to Fox Factory, Inc. on Jul. 15, 2003 for "Bicycle Fork Cartridge Assembly" (hereafter the "Becker Patent");

13. London Patent Number 36704/72 issued to Kayaba Kogyo Kabushiki Kaisha on Aug. 7, 1972 for "Suspension For Two-Wheeled Vehicle" (hereafter the "Kaisha London Patent");

14. International Publication Number WO 2005/054046 issued to Brian Jordan et al. and assigned to SRAM Corporation on Jun. 16, 2005 for "Adjustable Gas Spring Suspension System" (hereafter the "Jordan International Publication").

With respect to the Jerz Patent, this deals with a vehicle suspension system where there is a combination of a hard spring and a soft spring, and the travel of the soft spring is set by various stops and limit stops at certain locations near the bottom and near the top of the spring. Specifically the concept is "a vehicle suspension system including two springs connected in series, with one of the springs being stiffer than the other, and with the springs being so related that under normal load conditions the softer of the two springs is effected to provide a very gently cushioned ride, while upon the imposition of heavier load forces, the vehicle is supported more stiffly and primarily by the stronger spring. The conversion between these two conditions may be effected automatically, by engagement under heavy load conditions of stop shoulders acting to limit compression of the light spring. Similarly, upon excessive extension of the springs, an additional set of stop shoulder may automatically become effective to limit the amount of extension of the softer spring and cause the stiffer spring to resist further extension. A shock absorber may be utilized in conjunction with the springs, and may itself carry or include one or more of the stop shoulders".

The Okazima Patent deals with a vehicle suspension system for a fork assembly. Specifically the concept is to adjust the amount of spring force with a knob (36), where the appropriate selection of the position of the stopper (47) or of the cam seat (33) caused by rotating knob (36) to rotate the cam seat thereby changing the relative position of the legs (34) with respect to the cam surfaces (29) of the cap (27) and the second helical spring (45) may be preloaded or the preload of the second helical spring (45) may be appropriately varied.

The Nishikawa Patent discloses the ability to adjust the tension of the shock absorber by utilizing a dial (11) or dial (111) as shown in FIG. 6. The shock absorber itself is comprised of a piston cylinder assembly. A coiled suspension spring (16) is arranged between an annular upper spring seat (14) supported on the upper mounting member (11) and a lower spring seat (15) vertically adjustably mounted on the external periphery of the tubular casing (2) by appropriate well known means. The upper surface of the spring seat (14) is provided on the top surface with a scale (23) to indicate the intensity of the damping force. The upper spring seat (14) thus serves as a damping force adjusting dial rotatable relative to the upper mounting member (11).

The Cowan Patent is a design patent which protects the shape of the object.

The Ueno Design Patent that protects the shape or ornamental beauty of a shock absorber for a motorcycle but does not disclose how the device functions.

The Behrens Patent is a design patent for a bicycle fork.

The Johnsen Patent discloses a dual sping damping system having an inner spring and an outer spring where the adjustment is made to the outer spring by the rotatable ball valve lever (22).

The '075 Turner Patent for a "Bicycle Fork Suspension With Exchangeable Spring Unit" relates to various damping systems that can be included in the bicycle fork, including a hydraulic system and the concept of adjusting a preload to a knob.

The '998 Turner Patent deals with adjustable springs which can be air springs or gas springs as well as coil and elastomer springs. This patent deals discloses a compressor piston and other additions in order to improve suspension response.

The Rathburn Patent discloses a suspension fork including an operating device mounted externally to the telescoping fork leg that permits the rider to selectively shorten or lengthen the extent of relative travel between the inner and outer tubular sections of the fork.

The Denk Patent discloses the concept of having a single spring on top which can be adjusted for spring distance length by a rotatable knob. Specifically, the patent in relevant part reads as follows "the fixed shock absorber (10) which is, for example, configured as a cartridge in a bicycle fork or as an independent shock absorber, comprises a shock absorber cover (12) having a thread about its periphery into which spring (14) engages, whereby the shock absorber (10), respectively absorber cover (12), is movably fixed relative to spring (14). Shock absorber (10) is a preferably fixed at a position relative to an embracing member. The end (16) of the spring (14) is fixed in a rotocap (18). The rotocap (18) is mounted rotatably about axis (20). Upon rotating cap (18), spring (14) turns so that the thread pitch of spring (14) displaces axially relative to the thread. For example when shock absorber cover (12) including thread is displaced upwardly as a consequence of a rotation of rotocap (18) by the spring (14) about the distance (22), the effective spring length, which corresponds to the spacing between rotocap (18) and absorber head (12), decreases from the dimension (24) to the dimension (26)."

The Becker Patent discloses the concept of an adjustment mechanism on top a bicycle which is a preload adjuster assembly with a single spring on which the load is may be adjusted. The preload adjuster assembly (330) is desirably provided to allow adjustment of the preload on the second spring (322). The preload adjuster assembly (330) generally comprises an adjuster cap (332), an adjuster shaft (334) or barrel (336) and an adjuster knob (338). Rotation of the adjuster knob provides a plurality of preload adjustments.

The London Patent deals with adjustable hydraulic damper units that disclose the ability to adjust the effectiveness of spring damping via an adjustment knob.

The Jordan Patent discloses an Adjustable Gas Spring Suspension System".

There is a significant need for an improved shock distribution system that may be adjusted while the vehicle is in operation. Further there is a need for suspension system that has soft and firm setting adjustable spring characteristics.

SUMMARY OF THE INVENTION

The present invention is an adjustable coil spring system placed within a leg of a vehicle such as a mountain bicycle fork. The spring system comprises a first soft spring with an adjustable compressible distance, which is seated on top of a second firm spring having greater compression capability than the first soft spring. A coupler assembly comprising a threaded bolt threadedly received within a coupler is positioned between the two springs. A spring system adjustment means may comprise a knob connected to a non-round shaped shaft sliding within the threaded bolt having a non-round shaped central opening which is disposed within the first soft spring. As the knob is rotated in a given direction, the threaded bolt rotates correspondingly. The coupler then moves up along the threaded bolt and decreases the compression range of the first soft spring, thereby increasing spring system compressing force.

It has been discovered, according to a first preferred embodiment of the present invention, that if a spring system contained in a bicycle fork leg comprises a first soft spring mounted on top of a second firmer spring, then if the first soft spring is engaged with an adjustment means located at a readily accessibly position on a bicycle fork leg, then the spring compression characteristics of the system can be readily modified by the adjustment means causing the travel length of the first soft spring to be increased or deceased.

It has further been discovered, according to the first preferred embodiment of the present invention, that if the first soft spring is positioned on a coupler of the coupler assembly which has an adjustment receiving means and the second firm spring is positioned below the coupler, the adjustment means can cause the compressible distance of the first soft spring to be largely varied to thereby adjust the spring force of the spring assembly while the spring force of the second firm spring remains the same.

It has been additionally discovered, according to the second preferred embodiment of the present invention, that if a spring system contained in a bicycle fork leg comprises a first soft spring mounted on the bottom of a second firmer spring, then if the first soft spring is engaged with an adjustment means located at a readily accessibly position on a bicycle fork leg, then the spring compression characteristics of the system can be readily modified by the adjustment means causing the travel distance of the first soft spring to be increased or deceased.

It has further been discovered, according to the second preferred embodiment of the present invention, that if the second firm spring is positioned on a coupler of the coupler assembly which has an adjustment receiving means and the first soft spring is positioned below the coupler, the adjustment means can cause the compressible distance of the first soft spring to be largely varied to thereby adjust the spring force of the spring assembly while the spring force of the second firm spring remains the same.

It has further been discovered, according to the first and second preferred embodiments of the present invention, that by selecting a suitable thread size for a screw assembly configured to adjust the compression of the soft spring in a spring system, a user may quickly and dynamically adjust the spring force for user preferred characteristics while the vehicle is still in motion.

It has also been discovered, according to a third preferred embodiment of the present invention, that if a spring system contained in a bicycle fork leg is the opposite of the first preferred embodiment of the present invention and comprises a first soft spring mounted on the bottom of a second firmer spring, then if the first soft spring is engaged with an adjustment means located at a readily accessibly position on a bottom end of a bicycle fork leg, then the spring compression characteristics of the system can be readily modified by the adjustment means causing the travel distance of the first soft spring to be increased or deceased.

It is therefore an object of the present invention to provide a rapidly adjustable spring system for a vehicle such as a mountain bicycle by providing a spring system contained in a bicycle fork leg which comprises a first soft spring combined with a second firm spring in series. The first soft spring is engaged with an adjustment means located at a readily accessibly position on a bicycle fork leg so that the spring compression characteristics of the system can be readily modified by the adjustment means causing the travel distance of the first soft spring to be increased or deceased.

It is also an object of the present invention to provide a spring system containing a first shorter soft spring in conjunction of a second longer firm spring and an adjustable means for absorbing shock in order to dynamically improve handling performance in vehicles according to the user's preferences.

It is a further object of the present invention to provide a spring system containing a first shorter soft spring in conjunction of a second longer firm spring and an adjustable means that enables a user to dynamically adjust the spring characteristics in the field while the vehicle, such as a bicycle, is still in motion.

It is an additional object of the present invention to provide a spring system containing a first shorter soft spring in conjunction of a second longer firm spring and an adjustable means for absorbing shock that does not require additional cabling or other external means to a peripheral device attached elsewhere on the vehicle for manipulating the spring system compression characteristics.

It is another object of the present invention to provide a spring system containing a first shorter soft spring in conjunction of a second longer firm spring and an adjustable means for absorbing shock that does not add a significant amount of weight to the system.

It is a still further object of the present invention to provide two springs in series in conjunction with a coupler assembly, which can generate multiple preferred embodiments of the present invention on different mechanical structures, and that has a minimum amount of working parts. Similarly it is an object to provide a system that requires no cabling.

It is still a further object of the present invention to provide a spring system containing a first shorter soft spring in conjunction of a second longer firm spring and an adjustable means for absorbing shock that provides a one coil spring system which satisfies many different riders having varying weights and ride stiffness preferences.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
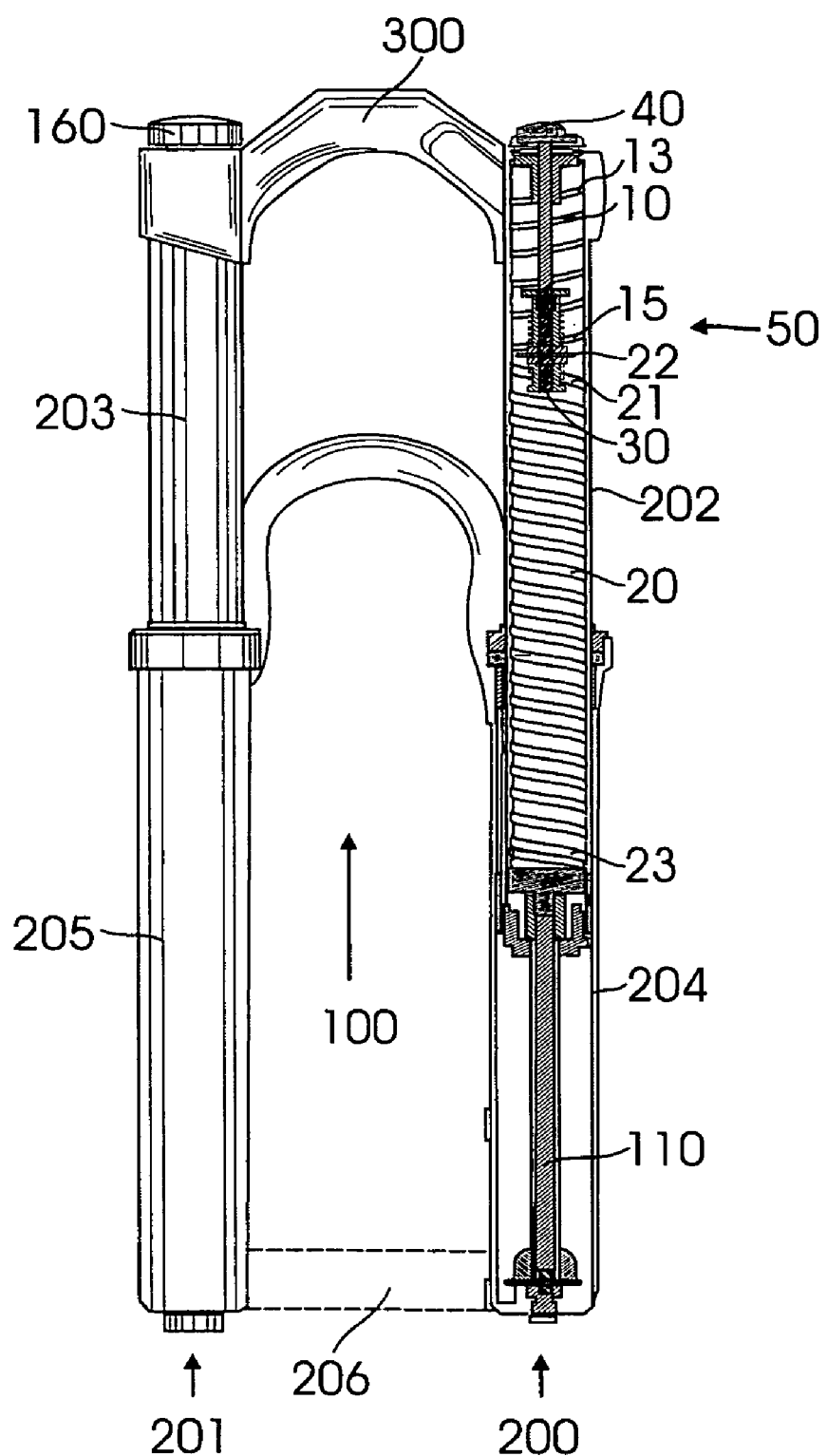
FIG. 1 is an elevational view of a vehicle fork with one leg shown in cross-section to illustrate the first preferred embodiment of the present invention adjustable spring system.

Referring to FIG. 1 which is a front elevational view in partial cross-section, there is illustrated a vehicle fork 100 containing the present invention adjustable and progressive coil spring system 50 within a first fork leg 200. The first fork leg 200 is constructed with a set of two matched telescoping hollow rods combined together, a first inner telescoping hollow rod 202 and a second outer telescoping hollow rod 204. Similarly, a second fork leg 201 is comprised of a second inner telescoping hollow rod 203 and an outer telescoping hollow rod 205. A transverse front wheel axle 206 is affixed to an outer end of the respective first and second outer telescoping hollow rods 204 and 205, and a crown 300 is transversely connected to an outer end of the respective first and second inner telescoping hollow rod 202 and 204. It will be appreciated that the inner and outer telescoping hollow rods are movable relative to each other along their longitudinal directions.

As further illustrated in FIG. 1, the adjustable and progressive coil spring system 50 for vehicles is comprised of a first spring 10 having a first end 13 and a second end 15, a second spring 20 having a first end 21 and a second end 23, a coupler assembly 30 which is retained between the first soft spring 10 and second firm spring 20, and a compression rod system 110 having a fixed length, wherein the first and second spring, the coupler assembly, and the compression rod system are placed within the first inner and outer telescoping hollow rods 202 and 204. A spring adjustment knob with detent 40 is placed at the outer end of the inner telescoping hollow rod 202. It will be appreciated that the first spring 10 is selected such that the first spring is comparatively tender or softer than the second spring 20, and noticeably shorter than the second spring. The relative mechanical positions are illustrated in FIG. 1 for the first soft spring 10, the second firm spring 20, the coupler assembly 30, the compression rod system 110, and the spring adjustment knob 40, wherein the first soft spring 10 is placed above the second firm spring 20, and the second spring 20 at the second end 23 is placed on the top of compression rod system 110.

Figure 2:
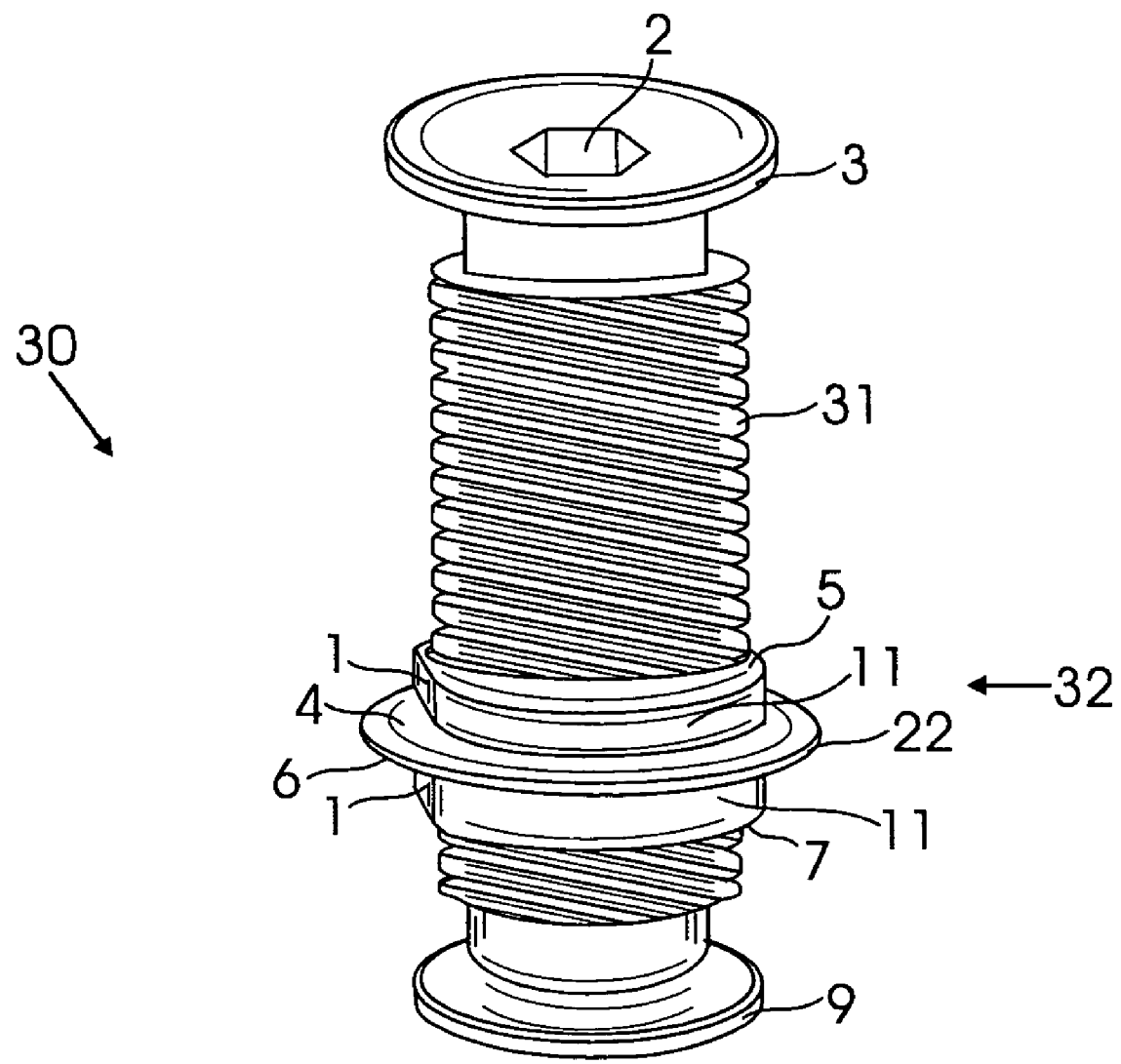
FIG. 2 is a perspective view of a coupler assembly of the present invention which is positioned between two springs, comprising a threaded bolt having a non-round shaped central opening which is disposed within the first soft spring and is threadedly received within a coupler of the assembly.

The coupler assembly 30 of the present invention is illustrated in FIG. 2, which is comprised of a male threaded bolt 31 and a female threaded coupler 32. The threaded bolt 31 is threadedly received within the coupler 32. The male threaded bolt 31 is comprised of a first disc end 3 and a second disc end 9 having an inner round bore extending through both ends, wherein a non-round shaped central opening 2 is located on the first end 3. In the preferred embodiment, the non-round central opening 2 is hexagonal. The coupler 32 is generally a "D" shaped nut with female threads having a transverse first top end 5 and a transverse second bottom end 7, and an outer flat vertical wall 1, which is aligned with an outer cylindrical wall 11. As illustrated, the coupler 32 at a middle position is surrounded by a transverse ring 22 having a first surface 4 and second surface 6, which evenly divides the flat and cylindrical wall 1 and 11.

Figure 3:
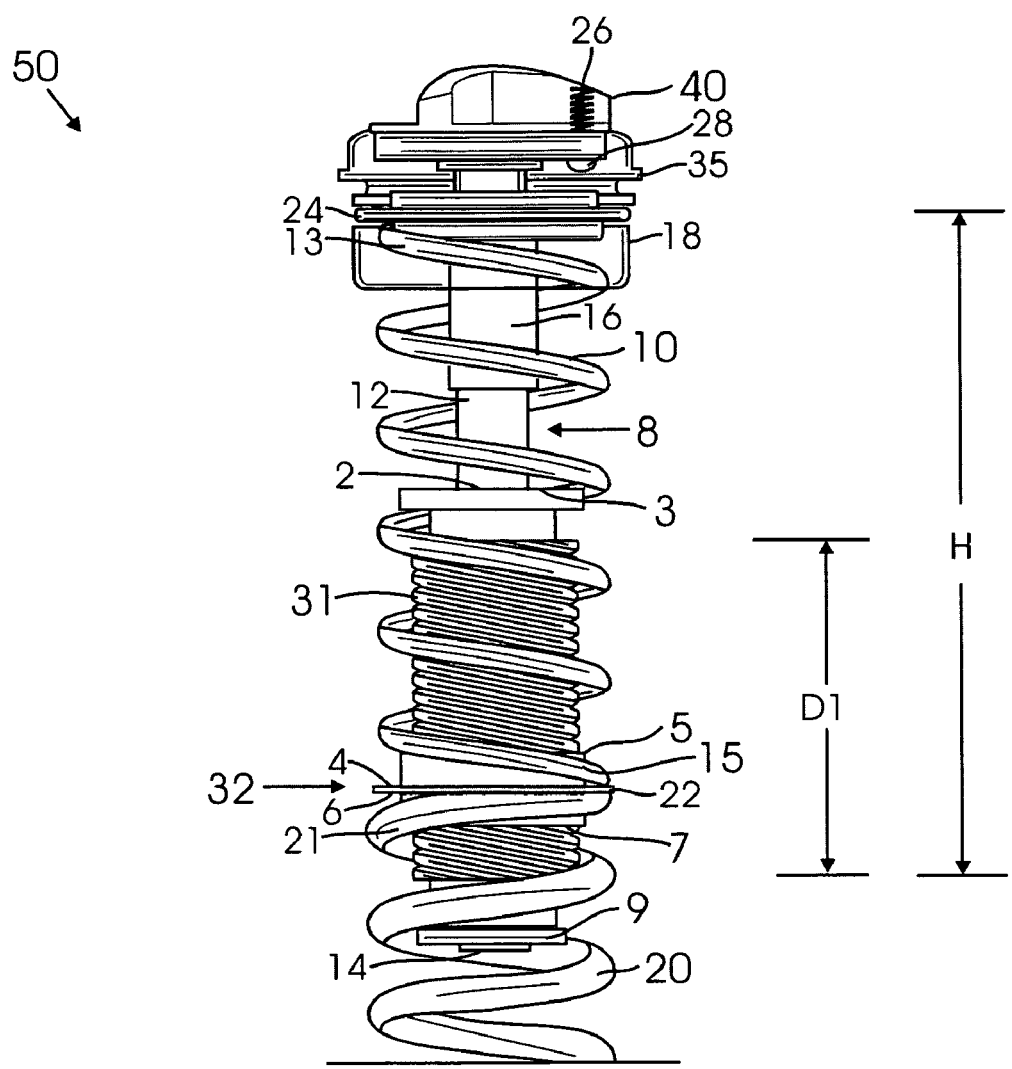
FIG. 3 is an elevational view of the first preferred embodiment of the present invention spring system having a first soft spring positioned above a second firm spring and a spring adjustment mechanism, the first soft spring illustrated in its almost fully extended least compressed condition.
Figure 4:
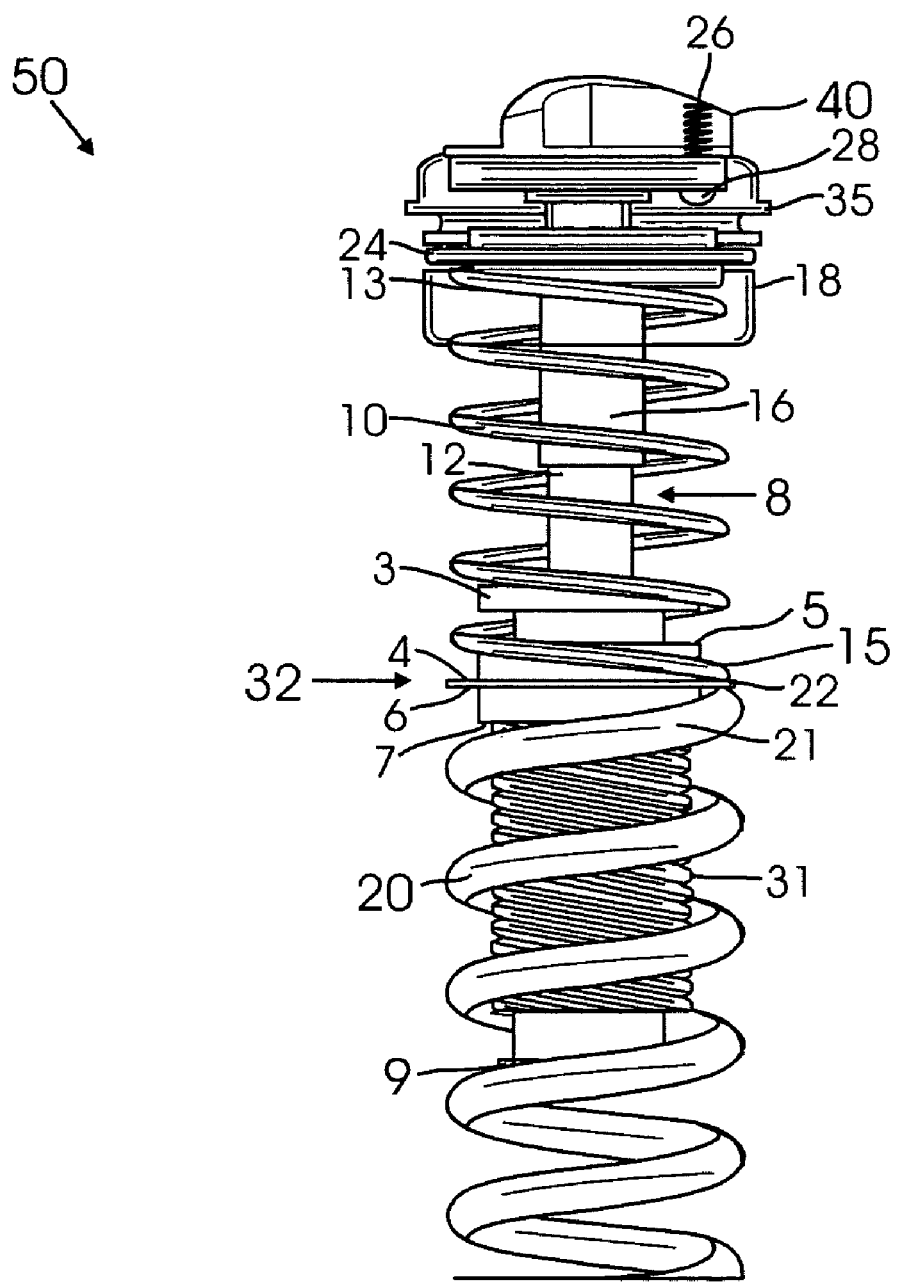
FIG. 4 is an elevational view of the first preferred embodiment of the present invention spring system having a first soft spring positioned above a second firm spring and a spring adjustment mechanism, the first soft spring illustrated in a fully compressed condition.

In a first preferred embodiment of the present invention as illustrated in FIG. 3, the first soft spring 10 is positioned so that its second end 15 sits on top of the first surface 4 of the coupler 32 of the assembly 30. The first end 3 of the threaded bolt 31 is disposed within the first soft spring 10, and the first end 5 of the coupler 32 is surrounded by the second end 15 of the first soft spring 10. It will be appreciated that the second end 15 of the first soft spring 10 is also a"D" shaped, which matches the shape of the first end 5 of the coupler 32. The second surface 6 of the coupler 32 sits on top of the second firm spring 20. The second end 7 of the coupler 32 and the second end 9 of the threaded bolt 31 are disposed within the second firm spring 20, wherein the firm spring 20 has the "D" shaped first end 21 to match the same "D" shape of the second end 7 of the coupler 32. As further illustrated in FIG. 3, a non-round shaped shaft 8 with a length at least equal to the height "H" of the first soft spring 10 is comprised of a top portion 12 and a bottom portion 14 where the bottom portion 14 of the non-round shaped shaft 8 is slid into the non-round shaped center opening 2 of the threaded bolt 31. In this way the first soft spring 10 surrounds the non-round shaped shaft 8. Alternatively described, the non-round shaped shaft 8 is positioned within the first soft spring 10. In this preferred embodiment, the non-round shaped shaft 8 is also hexagonal to match the shape of the center hole 2 of the threaded bolt 31. However, any non round shapes for the shaft 8 and opening 2 are within the spirit and scope of the present invention including but not limited to a triangular, square, pentagonal, hexagonal and oval shape. A tension adjustment knob with detent 40 connected to a rod having a lower retaining portion 16 is used to turn the non-round shaped shaft 8 for varying the length "H" of the first soft spring 10. Referring to FIGS. 3 and 4, there are illustrated the spring adjustment knob with detent 40, a top fastening portion 18 for mounting the knob onto the outer end of the inner telescoping rod 202, and a lower retaining portion 16 for fixedly retaining the top portion 12 of the non-round shaped shaft 8.

Referring once again to FIG. 1, there is illustrated that the present invention adjustable and progressive coil spring system 1 inside of the fork leg 200 in a no-rider load situation, when the first soft spring 10 and the second firm spring 20 are at their almost non compressive conditions since they are only under compression from a very limited load such as the weight of a bicycle. In contrast to the non-loaded condition, it will be appreciated that the first soft spring 10 and the second firm spring 20 will be relatively compressed when a rider is riding the bicycle. Under this situation, the rider can apply a changeable spring compression function of the adjustable and progressive coil spring system 1 of the present invention for the rider's needs with respect to a road-riding condition.

The rider can reduce almost all compressible distance of the first spring 10 if the rider wishes to have firm spring compression characteristics while riding the bicycle, which is illustrated in the elevational view of FIG. 4. In this condition, the first spring 10 is substantially compressed throughout the spring length adjustment by rotation of the knob 40. The knob 40 has been rotated counter clockwise by several turns so that the non-round shaped shaft 8 is slid into the threaded bolt 31 of the coupler assembly 30 and has driven the threaded bolt 31 with the same number of turns while the coupler 32 remains unturned due to its rotational restriction from respective connections of the"D" shaped second and first ends 15 and 21 of the first and second spring 10 and 20 and the "D" shaped first and second ends 5 and 7 of the coupler 32. It will be appreciated that, the coupler 32 is driven to move upward along the turned threaded bolt 31 while the turned threaded bolt 31 maintains its vertical position unchanged as the threaded bolt 31 is rotated. The first end 5 of the coupler 32 which supports the second end 15 of the soft spring 10 moves close to the first end 3 of the threaded bolt 31 until the first end 5 of the coupler 32 contacts the first end 3 of the threaded bolt 31. During this process, the turning force applied to the knob 40 by the rider is changed to a compression force continually applied to the first soft spring 10 to reduce the spring length, which makes the first soft spring 10 gradually compressed and finally make it substantially compressed as illustrated in FIG. 4. In this situation, the spring system 50 comprising of the softer first spring 10 in conjunction with the second firm spring 20 predominantly outputs a firm spring compression characteristics of the second spring 20, which will be suitable for a stiff riding condition.

In an opposite situation, the rider can rotate the knob 40 in a clockwise direction to expand the length of the soft spring 10 if the rider wants soft spring compression characteristics, as illustrated in FIG. 3 which shows the soft spring 10 is almost fully expanded. To achieve this condition, the rider turns the knob 40 to drive the non-round shaped shaft 8 which further drives the threaded bolt 31 in the same clockwise direction, to thereby move the coupler 32 down to thereby increase the distance between the first surface 4 of the coupler 32 and the position of the first end 13 of the first spring 10 to expand the length of the soft first spring 10. Concurrently the downward coupler 32 compresses the firm second spring 20, which results in that the compressible distance of the firm spring 20 being slightly reduced since the second firm spring 20 is longer than the first soft spring 10. Therefore, the first soft spring 10 can be maximumly expanded when the coupler 31 at its second end 7 moves down to contact the second end 9 of the threaded bolt 31. At this point, the spring system 1 maximumly exhibits the soft spring compression characteristics.

It will be appreciated that the above disclosure including the second hard or firm spring 20 is selected in order to improve the fork spring compression characteristics and specifically to optimize the performance of the shock absorbing system in response to riding conditions and the user's weight. The middle ring 22 of the coupler 32 of the assembly 30 is circular in order to facilitate retention within the fork leg 200. The non round "D" shaped first and second end 5 and 7 of the coupler also accommodates the respective seconded 15 of the first spring 10 and the first end 21 of the second spring 20 so that the coupler 32 itself cannot be turned when the threaded bolt 31 is turned. The length of the non-round shaped shaft 8 is selected to be of a length at least equal to the length of the first spring 10. The bolt 31 is threaded along its length in order to accept the coupler 32, wherein the non-round shaped hole 2 in the center of the coupler assembly 30 is further fixedly retained by the lower retaining portion 14 of the shaft 8 through the upper remaining portion 12 connected to the adjustment knob with detent 40. The coupler 32 may quickly be moved up and down by the non-round shaped shaft 8 in response to adjustments made to the knob 40. The first head 3 of the threaded bolt 31 is affixed to and turned by the non-round shaped shaft 8. A portion of the first soft spring 10 and second firm spring 20 surround the threaded bolt 31.

The exact position of the ring 22 of the coupler 31 of the assembly 30 as it is engaged on the non-round shaped shaft 8 changes the combination of spring compression characteristics. For example, referring to FIG. 3, there is illustrated an elevational view with the first softer spring 10 almost fully extended. In this position the spring system of the softer first spring 10 in conjunction with the second firm spring 20 outputs soft spring compression characteristics.

It will be appreciated that, between the positions of the coupler 32 illustrated in FIGS. 3 and 4, the spring system 50 comprising the first soft spring 10 in conjunction with the second firm spring 20 outputs intermediate spring compression characteristics. Therefore, FIGS. 1, 3, and 4 illustrate how the present invention can change the spring compression characteristics from soft to firm, or to various in-between spring compression characteristics by the spring system containing the first soft spring 10 and second firm spring 20 in conjunction with the coupler assembly 30 having the threaded bolt 31 threadedly received within the coupler 32.

The user may choose the soft spring compression characteristics for the spring system for his needs by turning the knob with detent 40 clockwise, such that the coupler 32 moves down to expend the soft spring 10.

The knob 40 itself may be configured with quick click settings that act to partially or wholly engage and compress the first soft spring 10. To modify the stiffness of the spring system, the first soft spring 10 is compressed against the knob 40 and top cap 24 by different amounts of compression. The user may reduce the first soft spring 10 tension in order to provide softer spring compression characteristics by turning the spring adjustment knob with detent 40 clockwise such that the coupler assembly 30 allows the first spring 10 to assume its natural extended position. Alternatively the rider may desire a stiffer ride in response to riding conditions. In this instance the rider may turn the adjustment knob 40 in the opposite direction and compress the first soft spring 10. As the user turns the spring adjustment knob 40 counter-clockwise, the coupler 32 travels up the threaded bolt 31 allowing the first spring 10 to compress. For rough terrain conditions, a partial to complete compression of the first soft spring 10 is desirable in order to absorb and better distribute the larger impact forces the user may encounter.

The relative travel distances "D1" between a soft setting and a firm setting for the soft spring 10 is illustrated in FIG. 3, where the soft spring 10 has a length "H" when it is fully relaxed.

Referring to FIGS. 3 and 4, there is also illustrated a side cross-sectional view of the adjustable knob with detent. The knob 40 comprises a spring 26 and detent locking mechanism 28. When the user turns the knob 40, there may be as many as five settings the user may quickly choose from. As the knob turns the detent locking mechanism 28 which is forced downwardly by the spring 26, the detent 28 is forced out of a pocket (not shown) in plate 35 until it engages in the next pocket. The engaging mechanism enables a user to readily tell by feel how many the compression settings have been adjusted before impact over a different terrain takes place.

Figure 5:
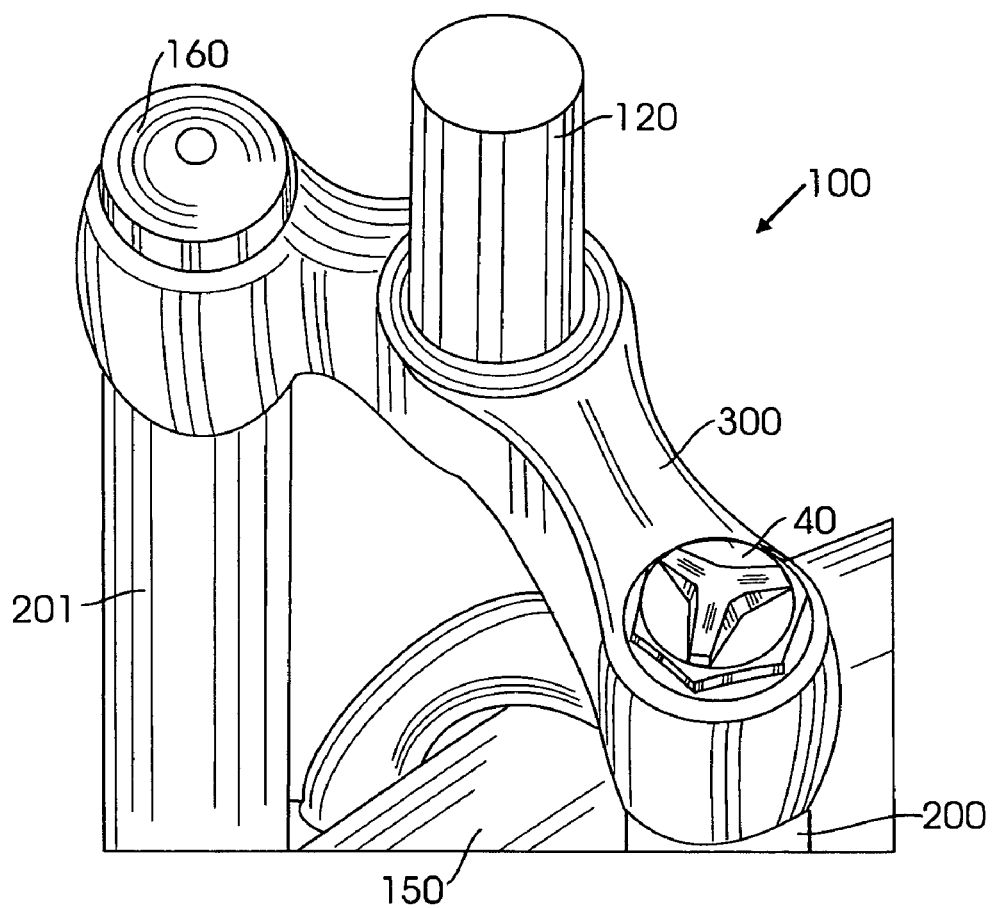
FIG. 5 is a top perspective view of a vehicle fork, illustrating the placement of the adjustment mechanism to adjust the compressible distance of the soft spring of the present invention.

Referring to FIG. 5, there is illustrated a top perspective view of the bicycle fork 100 with the compression adjustment knob 40. Also visible is a steering column 120, a first fork leg 200 which comprises the present invention, a second fork leg 201, the crown 300, and a top portion of a front wheel 150. For comparison purposes, a standard fork suspension cap 160 is also shown. One key aspect of the present invention is the relative size of the adjustment knob 40 in that the overall size is comparable to the standard fork cap 160, thereby reducing the added weight of the spring compression system 1 while still ensuring quick access for changing the spring compression characteristics of the first soft spring 10 at any time, even while the bicycle is in motion. Since the adjustment knob 40 is at the top of the fork 100, it can be easily and quickly reached by a rider to enable the rider to make rapid adjustments to the compression characteristics of the spring system to adjust for changing conditions during the ride.

Figure 6:
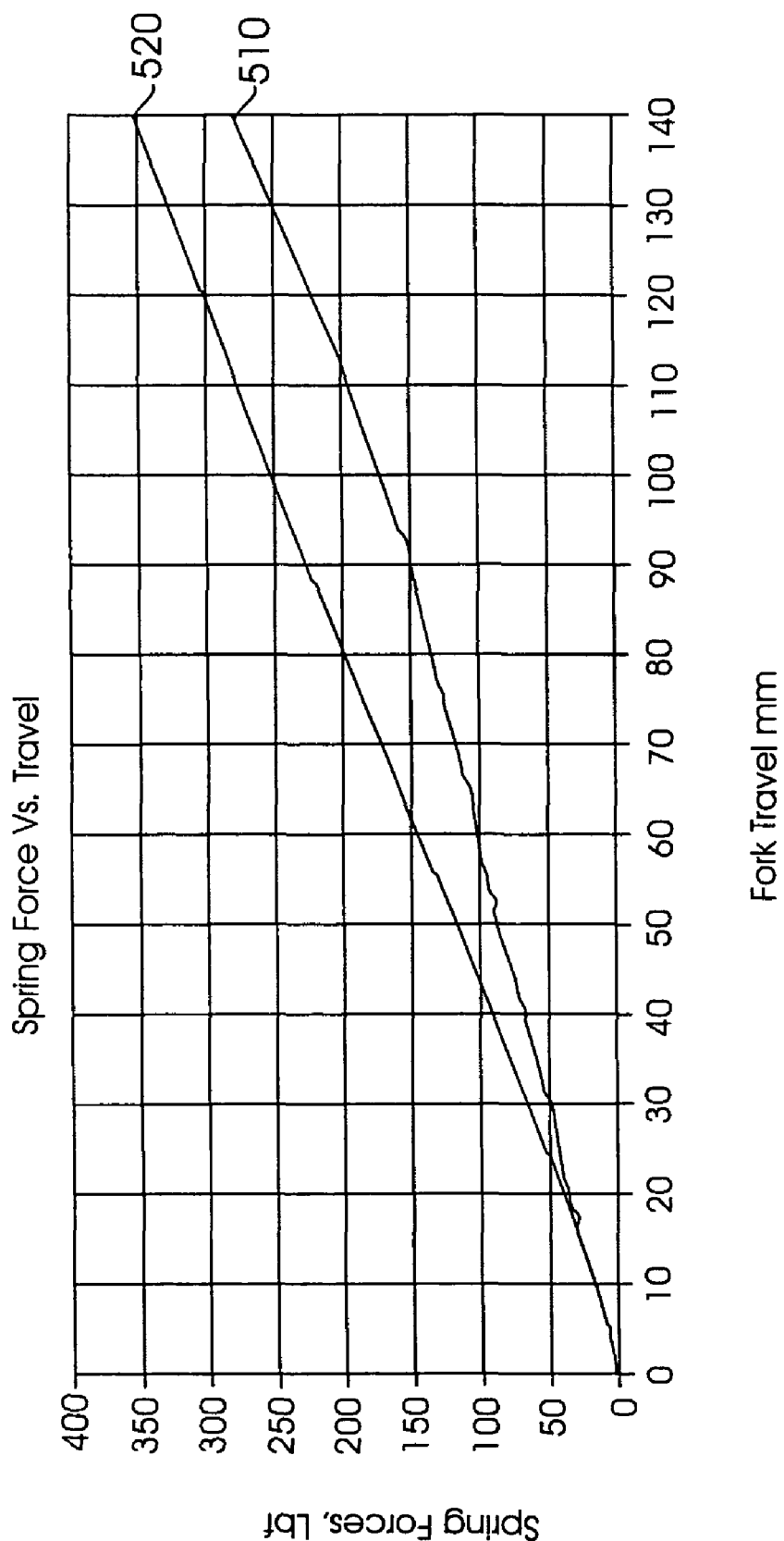
FIG. 6 is a line graph comparison showing the fork travel in millimeters compared to the spring force in pounds.

Referring to FIG. 6, a fork travel to spring force graph is shown that relates the distance of movement of the bicycle fork 100 with respect to the applied force of the spring compression system 1 set in its softest setting 510 and its firmest setting 520. When a force of roughly less than forty pounds of force is applied, both settings 510 and 520 respond similarly with respect to overall fork travel. However, as the applied force increases, the softer setting line 510 diverges from the firm setting line 520. It can be seen from the graph that the soft setting line 510 has greater fork travel than the firm setting line 520 when an equal force is applied. At maximum fork travel of 140 mm, a further innovation of the spring compression system 1 is shown as the difference of applied force in order to incur maximum fork travel between the soft setting line 510 and firm setting 520 is seventy-five pounds of bottom-out load. Again this difference in firmness of the system may be accomplished in as little as five turns of the adjustment knob 40.

Through application of the present invention adjustable and progressive coil spring system 50, the vehicle fork 100 can be designed in various ways but holds the same spring compression characteristics.

Figure 7:
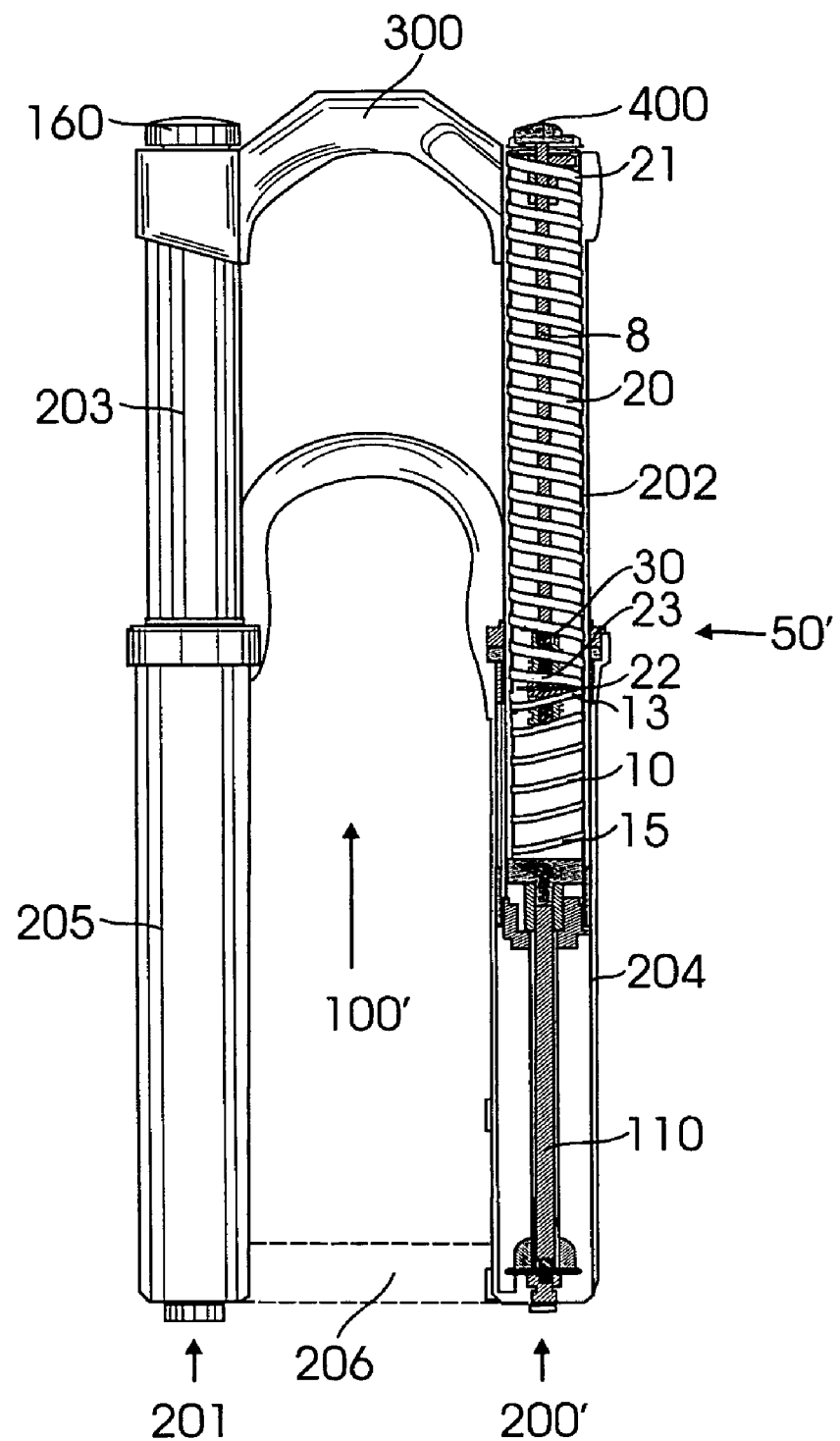
FIG. 7 is an elevational view of a vehicle fork with one leg shown in cross-section to illustrate the second preferred embodiment of the present invention adjustable spring system.

Referring to FIG. 7, there is illustrated second preferred embodiment of the vehicle fork 100' containing the present invention adjustable and progressive coil spring system 50' placed inside of a first fork leg 200'. In contrast to the configuration where the first soft spring 10 sits on the top of the firm second spring 20 as in the first preferred embodiment shown in FIG. 1, in this second embodiment the second firm spring 20 can be arranged to sit on the top of the first soft spring 10 in conjunction of the coupler assembly 30. As illustrated, the first fork leg 200' is comprised of the inner telescoping hollow rod 202 movably received within the outer telescoping hollow rod 204, when the first fork leg 200' at the outer end of the inner telescoping hollow rod 202 is transversely connected to the crown 300, and at the outer end of the outer telescoping hollow rod 204 transversely connected to the wheel axle 206. Within the hollow telescoping rods, there are installed with the first soft spring 10 and the second firm spring 20, the coupler assembly 30, and the compression rod system 110, wherein the second firm spring 20 at its first end 21 is placed under the spring adjustment knob with detent 40 which is placed at the outer end of the inner telescoping rod 202, and at its second end 23 is placed on the first surface of the middle transverse ring 22 of the coupler 32, wherein the threaded bolt 31 is threadedly received within the coupler 32. The middle ring 22 of the coupler sits on the first end 13 of the first soft spring 10, and the second end 15 of the first soft spring 10 is placed on the top of the compression rod system 110. In accordance with the second preferred embodiment, the non-round shaft 8 is at least longer than the length of the second firm spring 20. From application of the spring system 50', the soft spring compression characteristics can be achieved with a counter clockwise rotation of the spring adjustment knob with detent 40, which moves the coupler 32 up to compress the firm second spring 20, and relax the soft first spring 10. In reverse, if the firm spring compression characteristics is desired, the spring adjustment knob with detent 40 can be rotated clockwise to move the coupler 32 down, which compresses the first soft spring 10 and simultaneously slightly relaxes the second firm spring 20 as shown in FIG. 7.

Figure 8:
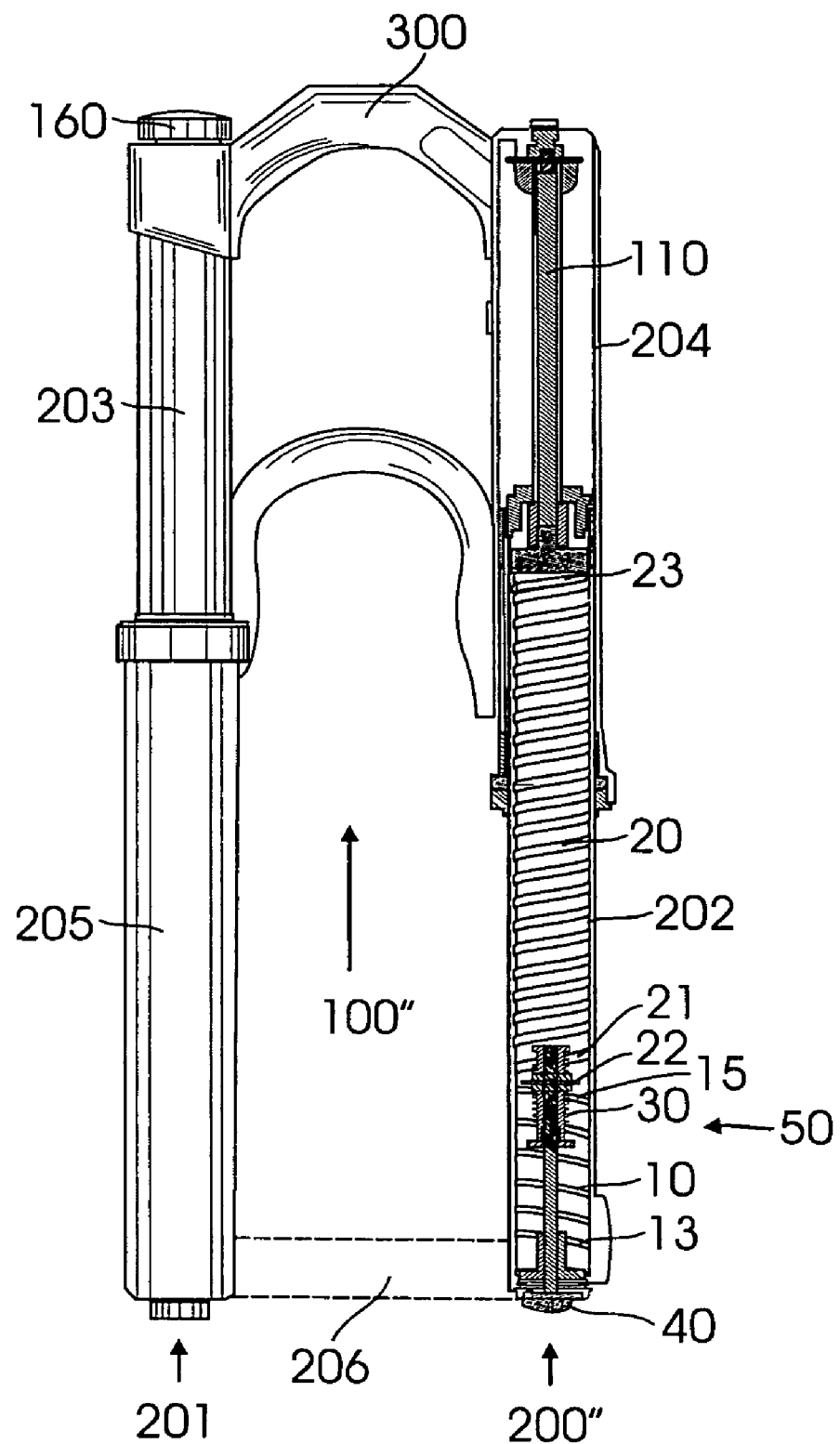
FIG. 8 is an elevational view of a vehicle fork with one leg shown in cross-section to illustrate the third preferred embodiment of the present invention adjustable spring system.

For the third preferred embodiment of the vehicle fork 100" shown in FIG. 8, there is illustrated first fork leg 200", which is the same as the first fork leg 200 in the first preferred embodiment introduced in FIG. 1 but is reversely installed into the fork 100", wherein the outer end of the outer hollow telescoping rod 204 is transversely connected to the crown 300, and the outer end of the inner hollow telescoping rod 202 is transversely connected to the wheel axle 206. In this setting, the spring adjustment knob with detent 40 is placed at the bottom of the first fork leg 200" and adjacent to the wheel axle 206, which makes adjustment of the spring system unavailable for the rider while riding the vehicle such as the bike. This it is the only difference in the third preferred embodiment of the vehicle fork, in comparison with the first preferred embodiment.

Therefore, the key novel feature of the present invention is to have a combination of a first soft spring 10 effectively seated on top of a second hard or firm spring 20 through a connection of a coupler assembly 30 comprising a threaded bolt 31 threadedly received within a coupler 32 where the compression characteristics of the overall spring assembly are modified by adjusting the length of the first soft spring 10 relative to the length of the second hard or firm spring 20, which almost remains the same. By enabling the compression characteristics of the first soft spring 10 which sits on top of the second hard or firm spring 20 to be modified by the adjustment mechanism which is easily reachable by a rider while the rider is riding on the vehicle such as a bicycle, the rider can adjust the overall spring compression of the fork mechanism while the rider is riding on the bicycle so that adjustments can be rapidly made to the changing conditions along the path that is being ridden.

The present invention spring compression system 1 can be used with any vehicle fork such as a bicycle fork or a motorcycle fork.

Defined in detail as a first embodiment, the present invention is a coil spring system to be used within a leg of a bicycle fork comprising: (a) a first soft spring with a first and second end having a given height when in the fully extended condition, and a second firm spring with a first and second end having a greater height than the first soft spring; (b) a coupler assembly comprising a coupler and a threaded bolt, the coupler having a first and second end including an internally threaded bore and a transverse outer ring located at the middle of the coupler, the transverse ring having a first surface and a second surface wherein the first soft spring at its second end rests on the first surface and the second firm springs at its first end rests below the second surface, the first soft spring positioned above the second firm spring so that a the first end of the first soft spring rests adjacent a top end of the vehicle fork leg, the threaded bolt having a first and second end including a central bore with a non-round opening at the first end, the threaded bolt being threadedly received at the center of the coupler; (c) a non-round shaped shaft having a length at least equal to the height of the first soft spring, the non-round shaped shaft having a top portion and a bottom portion, the bottom portion of the shaft inserted within the central bore with the non-round opening of the coupler member such that the threaded bolt is centrally positioned within the first soft spring; (d) an adjustment knob having a knob, a top fastening portion for mounting the knob onto a top of the leg of the bicycle fork and a lower retaining portion for fixedly retaining the top portion of the non-round shaped shaft; (e) a compression rod system including the second firm spring retained at the top of the compression rod system, the first soft spring and the second firm spring and the coupler member and the non-round shaped shaft and the compression rod system resting within the leg of the bicycle fork; and (f) the spring compression range of the first soft spring is selectively increased by turning the knob in one direction to cause rotation of the threaded bolt which further moves the coupler away from the knob to thereby increase the height of the first soft spring and the spring compression range of the first soft spring is selectively decreased by rotating the knob in the opposite direction to cause the coupler to move closer to the knob to thereby decrease the height of the first soft spring.

For the first embodiment, defined more broadly, the present invention is a coil spring system to be used within a leg of a bicycle fork, comprising: (a) a first soft spring having a given length when in the fully extended condition and having a first end and a second end, and a second firm spring having greater length than the first soft spring and having a first and second end, the first soft spring positioned on top of the second firm spring so that the second end of the first soft spring rests adjacent the first end of the second firm spring and the first end of the first soft spring rests adjacent a top end of the bicycle fork leg, both springs resting within the leg of the bicycle fork; (b) a coupler assembly comprising a threaded bolt threadedly received with a coupler, the coupler positioned between the first and second spring; and (c) a spring adjustment means retained on the bicycle fork at a location adjacent the top of the fork leg and in communication with the first soft spring through the coupler so that the length of the first soft spring is selectively increased by moving the spring adjustment means in one direction and the length of the first soft spring is selectively decreased by moving the spring adjustment means in the opposite direction.

For the first embodiment, defined most broadly, the present invention a coil spring damping system to be used within a leg of a vehicle fork, comprising: (a) a first soft spring with a first and second end having a given length when in the fully extended condition, and a second firm spring with a first and second end having a greater spring length than the first soft spring, the first soft spring positioned on top of the second firm spring so that the second end of the first soft spring rests adjacent a first end of the second firm spring and the first end of the first soft spring rests adjacent a top end of the vehicle fork leg, both springs resting within the leg of the vehicle fork; (b) a coupler means is placed between the first and second springs; and (c) a spring adjustment means retained on the vehicle fork leg at a location adjacent the top of the fork leg and in communication with the first soft spring through the coupler means so that the length of the first soft spring is selectively increased by moving the spring adjustment means one way and the length on the first soft spring is selectively decreased by moving the spring adjustment means in an opposite way.

Defined in detail for a second embodiment, the present invention is a coil spring system to be used within a leg of a bicycle fork comprising: (a) a first soft spring with a first and second end having a given height when in the fully extended condition, and a second firm spring with a first and second end having a greater height than the first soft spring; (b) a coupler assembly comprising a coupler and a threaded bolt, the coupler having a first and second end including an internally threaded bore and a transverse outer ring located at the middle of the coupler, the transverse ring having a first surface and a second surface wherein the first soft spring at its first end rests below the second surface and the second firm springs at its second end rests on the first surface, the second firm spring positioned above the first soft spring so that a the first end of the second firm spring rests adjacent a top end of the vehicle fork leg, the threaded bolt having a first and second end including a central bore with a non-round opening at the first end, the threaded bolt being threadedly received at the center of the coupler; (c) a non-round shaped shaft having a length at least equal to the height of the first soft spring, the non-round shaped shaft having a top portion and a bottom portion, the bottom portion of the shaft inserted within the central bore with the non-round opening of the coupler member such that the threaded bolt is centrally positioned within the first soft spring; (d) an adjustment knob having a knob, a top fastening portion for mounting the knob onto a top of the leg of the bicycle fork and a lower retaining portion for fixedly retaining the top portion of the non-round shaped shaft; (e) a compression rod system including the first soft spring retained at the top of the compression rod system, the first soft spring and the second firm spring and the coupler member and the non-round shaped shaft and the compression rod system resting within the leg of the bicycle fork; and (f) the spring compression range of the first soft spring is selectively increased by turning the knob in one direction to cause rotation of the threaded bolt which further moves the coupler away from the knob to thereby increase the height of the first soft spring and the spring compression range of the first soft spring is selectively decreased by rotating the knob in the opposite direction to cause the coupler to move closer to the knob to thereby decrease the height of the first soft spring.

For the second embodiment, defined alternatively more broadly, the present invention is a coil spring system to be used within a leg of a bicycle fork, comprising: (a) a first soft spring having a given length when in the fully extended condition and having a first end and a second end, and a second firm spring having greater length than the first soft spring and having a first and second end, the first soft spring positioned adjacent the bottom of the second firm spring so that the first end of the first soft spring rests adjacent the second end of the second firm spring and the first end of the second firm spring rests adjacent a top end of the bicycle fork leg, both springs resting within the leg of the bicycle fork; (b) a coupler assembly comprising a threaded bolt threadedly received with a coupler, the coupler is placed between the first and second spring; and (c) a spring adjustment means retained on the bicycle fork at a location adjacent the top of the fork leg and in communication with the first soft spring through the coupler so that the length of the first soft spring is selectively increased by moving the spring adjustment means in one direction and the length on the first soft spring is selectively decreased by moving the spring adjustment means in the opposite direction.

For the second embodiment, defined most broadly, the present invention is a coil spring damping system to be used within a leg of a vehicle fork, comprising: (a) a first soft spring with a first and second end having a given length when in the fully extended condition, and a second firm spring with a first and second end having a greater spring length than the first soft spring, the first soft spring positioned adjacent the bottom of the second firm spring so that the first end of the first soft spring rests adjacent a second end of the second firm spring and the first end of the second firm spring rests adjacent a top end of the vehicle fork leg, both springs resting within the leg of the vehicle fork; (b) a coupler means is placed between the first and second springs; and (c) a spring adjustment means retained on the vehicle fork leg at a location adjacent the top of the fork leg and in communication with the first soft spring through the coupler means so that the length of the first soft spring is selectively increased by moving the spring adjustment means one way and the length on the first soft spring is selectively decreased by moving the spring adjustment means in an opposite way.

For a third embodiment defined in detail, the present invention is a coil spring system to be used within a leg of a bicycle fork comprising: (a) a first soft spring with a first and second end having a given height when in the fully extended condition, and a second firm spring with a first and second end having a greater height than the first soft spring; (b) a coupler assembly comprising a coupler and a threaded bolt, the coupler having a first and second end including an internally threaded bore and a transverse outer ring located at the middle of the coupler, the transverse ring having a first surface and a second surface wherein the first soft spring at its first end rests below the second surface and the second firm springs at its second end rests on the first surface, the first soft spring positioned below the second firm spring so that a the second end of the first soft spring rests adjacent a bottom end of the vehicle fork leg, the threaded bolt having a first and second end including a central bore with a non-round opening at the first end, the threaded bolt being threadedly received at the center of the coupler; (c) a non-round shaped shaft having a length at least equal to the height of the first soft spring, the non-round shaped shaft having a top portion and a bottom portion, the bottom portion of the shaft inserted within the central bore with the non-round opening of the coupler member such that the threaded bolt is centrally positioned within the first soft spring; (d) an adjustment knob having a knob, a fastening portion for mounting the knob onto a bottom of the leg of the bicycle fork and a lower retaining portion for fixedly retaining a portion of the non-round shaped shaft;(e) a compression rod system including the second firm spring retained below the compression rod system, the first soft spring and the second firm spring and the coupler member and the non-round shaped shaft and the compression rod system resting within the leg of the bicycle fork; and (f) the spring compression range of the first soft spring is selectively increased by turning the knob in one direction to cause rotation of the threaded bolt which further moves the coupler away from the knob to thereby increase the height of the first soft spring and the spring compression range of the first soft spring is selectively decreased by rotating the knob in the opposite direction to cause the coupler to move closer to the knob to thereby decrease the height of the first soft spring.

For the third embodiment, defined more broadly, the present invention is a coil spring system to be used within a leg of a bicycle fork, comprising: (a) a first soft spring having a given length when in the fully extended condition and having a first end and a second end, and a second firm spring having greater length than the first soft spring and having a first and second end, the first spring positioned adjacent a bottom of the second firm spring so that the first end of the first soft spring rests adjacent to the second end of the second firm spring and the second end of the first soft spring rests adjacent a bottom end of the bicycle fork leg, both springs resting within the leg of the bicycle fork; (b) a coupler assembly comprising a threaded bolt threadedly received with a coupler, the coupler is placed between the first and second springs; and (c) a spring adjustment means retained on the bicycle fork at a location adjacent a bottom of the fork leg and in communication with the first soft spring through the coupler so that the length of the first soft spring is selectively increased by moving the spring adjustment means in one direction and the length on the first soft spring is selectively decreased by moving the spring adjustment means in the opposite direction.

For the third embodiment, defined most broadly, the present invention is a coil spring damping system to be used within a leg of a vehicle fork, comprising: (a) a first soft spring with a first and second end having a given length when in the fully extended condition, and a second firm spring with a first and second end having greater spring length than the first soft spring, the first soft spring positioned adjacent a bottom of the second firm spring so that the first end of the first soft spring rests close to a second end of the second firm spring and the second end of the first soft spring rests adjacent a bottom end of the vehicle fork leg, both springs resting within the leg of the vehicle fork; (b) a coupler means is placed between the first and second spring; and (c) a spring adjustment means retained on the vehicle fork leg at a location adjacent the bottom of the fork leg and in communication with the first soft spring through the coupler means so that the length of the first soft spring is selectively increased by moving the spring adjustment means one way and the length on the first soft spring is selectively decreased by moving the spring adjustment means in an opposite way.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A coil spring system to be used within a leg of a bicycle fork comprising:
   a. a first soft spring with a first and second end having a given height when in the fully extended condition, and a second firm spring with a first and second end having a greater height than the first soft spring;
   b. a coupler assembly comprising a coupler and a threaded bolt, the coupler having a first and second end including an internally threaded bore and a transverse outer ring located at the middle of the coupler, the transverse ring having a first surface and a second surface wherein the first soft spring at its second end rests on the first surface and the second firm spring at its first end rests below the second surface, the first soft spring positioned above the second firm spring so that the first end of the first soft spring rests adjacent a top end of the vehicle fork leg, the threaded bolt having a first and second end including a central bore with a non-round opening at the first end, the threaded bolt being threadedly received at the center of said coupler;
   c. a non-round shaped shaft having a length at least equal to the height of the first soft spring, the non-round shaped shaft having a top portion and a bottom portion, the bottom portion of the shaft inserted within the central bore with the non-round opening of the coupler member such that the threaded bolt is centrally positioned within the first soft spring;
   d. an adjustment knob having a knob, a top fastening portion for mounting the knob onto a top of the leg of the bicycle fork and a lower retaining portion for fixedly retaining the top portion of the non-round shaped shaft;
   e. a compression rod system including the second firm spring retained at the top of the compression rod system, the first soft spring and the second firm spring and the coupler member and the non-round shaped shaft and the compression rod system resting within the leg of the bicycle fork; and
   f. the spring compression range of the first soft spring is selectively increased by turning the knob in one direction to cause rotation of the threaded bolt which further moves the coupler away from the knob to thereby increase the height of the first soft spring and the spring compression range of the first soft spring is selectively decreased by rotating the knob in the opposite direction to cause the coupler to move closer to the knob to thereby decrease the height of the first soft spring.

2. The coil spring system in accordance with claim 1 wherein the shape of the non-round shaped shaft is selected from the group comprising triangular, square, pentagonal, hexagonal and oval.

3. A coil spring system to be used within a leg of a bicycle fork, comprising:
   a. a first soft spring having a given length when in the fully extended condition and having a first end and a second end, and a second firm spring having greater length than the first soft spring and having a first and second end, the first soft spring positioned on top of the second firm spring so that the second end of the first soft spring rests adjacent the first end of the second firm spring and the first end of the first soft spring rests adjacent a top end of the bicycle fork leg, both springs resting within the leg of the bicycle fork;
   b. a coupler assembly comprising a threaded bolt having first and second ends including a central bore with a non-round opening at the first end, wherein the threaded bolt is threadedly received at a center of the coupler, said coupler positioned between said first and second spring; and
   c. a spring adjustment means retained on the bicycle fork at a location adjacent the top of the fork leg and in communication with the first soft spring through said coupler so that the length of the first soft spring is selectively increased by moving the spring adjustment means in one direction and the length of the first soft spring is selectively decreased by moving the spring adjustment means in the opposite direction.

4. The coil spring system in accordance with claim 3 further comprising said spring adjustment means being connected to a non-round shaft to communicate with said coupler of the coupler assembly.

5. The coil spring system in accordance with claim 4 wherein the shape of the non-round shaped shaft is selected from the group comprising triangular, square, pentagonal, hexagonal and oval.

6. A coil spring damping system to be used within a leg of a vehicle fork, comprising:
   a. a first soft spring with a first and second end having a given length when in the fully extended condition, and a second firm spring with a first and second end having a greater spring length than the first soft spring, the first soft spring positioned on top of the second firm spring so that the second end of the first soft spring rests adjacent the first end of the second firm spring and the first end of the first soft spring rests adjacent a top end of the vehicle fork leg, both springs resting within the leg of the vehicle fork;
   b. a coupler assembly comprising a coupler and a threaded bolt with a first end including a central bore with a non-round opening at the first end, the threaded bolt being threadedly received at a center of said coupler assembly, the coupler assembly placed between said first and second springs;

c. a non-round shaped shaft having a length at least equal to the given length of the first soft spring, the non-round shaped shaft having a top portion and a bottom portion, the bottom portion of the shaft inserted within the central bore with the non-round opening of the coupler assembly such that the threaded bolt is centrally positioned within the first soft spring; and d. a spring adjustment means retained on the vehicle fork leg at a location adjacent the top of the fork leg and in communication with the first soft spring through said coupler means so that the length of the first soft spring is selectively increased by moving the spring adjustment means one way and the length on the first soft spring is selectively decreased by moving the spring adjustment means in an opposite way.

7. The coil spring system in accordance with claim 6 further comprising said spring adjustment means being connected to a non-round shaft to communicate with said coupler assembly.

8. The coil spring system in accordance with claim 7 wherein the shape of the non-round shaped shaft is selected from the group comprising triangular, square, pentagonal, hexagonal and oval.

9. A coil spring damping system to be used within a leg of a vehicle fork, comprising:

a. a first soft spring with a first and second end having a given length when in the fully extended condition, and a second firm spring with a first and second end having a greater spring length than the first soft spring, the first soft spring positioned on top of the second firm spring so that the second end of the first soft spring rests adjacent the first end of the second firm spring and the first end of the first soft spring rests adjacent a top end of the vehicle fork leg, both springs resting within the leg of the vehicle fork;

b. a coupler means is placed between said first and second springs;

c. a compression rod system including the second firm spring retained at the top of the compression rod system; and d. a spring adjustment means retained on the vehicle fork leg at a location adjacent the top of the fork leg and in communication with the first soft spring through said coupler means so that the length of the first soft spring is selectively increased by moving the spring adjustment means one way and the length of the first soft spring is selectively decreased by moving the spring adjustment means in an opposite way.

10. The coil spring system in accordance with claim 9 further comprising said spring adjustment means being connected to a non-round shaft to communicate with said coupler means.

11. The coil spring system in accordance with claim 10 wherein the shape of the non-round shaped shaft is selected from the group comprising triangular, square, pentagonal, hexagonal and oval.

\* \* \* \* \*